(12) United States Patent
Gebert et al.

(10) Patent No.: US 6,368,506 B1
(45) Date of Patent: Apr. 9, 2002

(54) RING ENCASEMENT WITH CLAMPS FOR ZIGZAG FOLD PAPER

(75) Inventors: Hans Gebert, Heilbronn; Claude Gebler, Stuttgart; Dieter Noack, Bietigheim/Bissingen; Horst Scheider, Waiblingen; Hans Waibel, Remseck/Aldingen, all of (DE)

(73) Assignee: Knecht Filterwerke GmbH, Stuttgart (DE)

( * ) Notice: Subject to any disclaimer, the term of this patent is extended or adjusted under 35 U.S.C. 154(b) by 0 days.

(21) Appl. No.: 09/486,339

(22) PCT Filed: Oct. 14, 1998

(86) PCT No.: PCT/DE98/03071

§ 371 Date: Feb. 25, 2000

§ 102(e) Date: Feb. 25, 2000

(87) PCT Pub. No.: WO99/21636

PCT Pub. Date: May 6, 1999

(30) Foreign Application Priority Data

Oct. 23, 1997 (DE) .......................... 197 46 751

(51) Int. Cl.[7] .......................... B01D 29/07; B01D 27/06
(52) U.S. Cl. ................ 210/493.1; 210/483; 210/493.5; 210/497.01; 210/455; 210/457; 55/492; 55/493; 55/498; 55/521
(58) Field of Search ............................. 210/483, 493.1, 210/493.5, 495, 497.01, 493.2, 457, 232, 487, 455, 454, 453, 451; 55/521, 500, 497, 491–493, 498

(56) References Cited

U.S. PATENT DOCUMENTS

| 3,828,529 A | | 8/1974 | Frey et al. |
| 4,419,241 A | * | 12/1983 | Hoffman .................. 210/493.5 |
| 4,735,720 A | * | 4/1988 | Kersting .................. 210/493.5 |
| 5,409,606 A | * | 4/1995 | Spencer ...................... 210/232 |
| 5,622,624 A | * | 4/1997 | Lauer et al. ................. 210/232 |

FOREIGN PATENT DOCUMENTS

| AU | 275874 | * | 4/1965 |
| DE | 31 28 546 | | 2/1983 |
| DE | 34 15 425 | | 10/1984 |
| DE | 44 17 298 | | 11/1995 |
| DE | 195 07 485 | | 9/1996 |
| DE | 195 48 864 | | 7/1997 |
| FR | 1396322 | * | 3/1965 |
| WO | WO93/11849 | | 6/1993 |
| WO | WO94/42818 | | 10/1994 |
| WO | WO94/25138 | | 11/1994 |

* cited by examiner

Primary Examiner—Matthew O. Savage
Assistant Examiner—Marianne Ocampo
(74) Attorney, Agent, or Firm—Collard & Roe, P.C.

(57) ABSTRACT

The invention relates to a filter, especially an oil filter, comprising a carrier casing which borders a clean room/chamber. The filter also has a filter element which encloses the carrier casing. The filter element is comprised of zigzag shaped folded strip material, whereby the end folds of the filter element are adjacently held together. In order to construct the filter in such a way that a mass-production with a high operational reliability is guaranteed, a clamping strip which fastens the end folds of the filter element is arranged on the exterior surface of the carrier casing.

13 Claims, 3 Drawing Sheets

RING ENCASEMENT WITH CLAMPS FOR ZIGZAG FOLD PAPER

Figure 1:
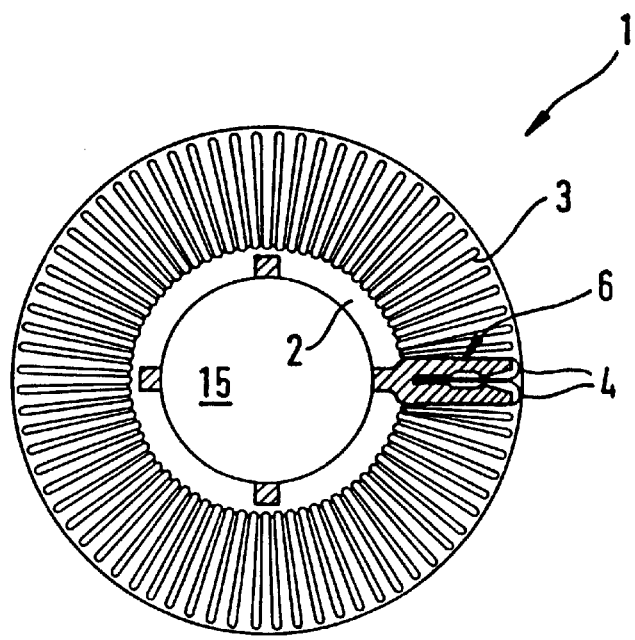

The invention relates to a filter, in particular an oil filter, according to the preamble of claim 1.

WO 94/23818 discloses a filter which has a filter element in the form of a zigzag-folded web material and a carrier casing which functions as a supporting body. The filter element forms a zigzag-fold arrangement which encloses the hollow-cylindrical carrier casing. The end folds of the filter element butt against one another and are connected to one another, in order to prevent unwanted flows between the contaminated side and the clean side of the filter element. The abutting end folds are connected securely by adhesive. Provided for this purpose is a recessed clamp in which there engage the end folds and ends of an expanded metal jacket which surrounds the zigzag-fold arrangement. In this case, said clamp forms a type of longitudinal seam clip which allows preliminary fixing of the expanded metal jacket and zigzag-fold arrangement, the then V-shaped ends of the expanded metal jacket and of the zigzag-fold arrangement forming a feed channel for the adhesive.

The problem here is that the sealing of the connection of the two end folds cannot be reliably ensured as a result of production tolerances in the case of adhesive bonding or stapling, with the result that flow medium which has not been cleaned can pass from the contaminated side into the clean side.

A further disadvantage is that, during the production of the filter, first of all the end folds have to be connected and then the web material has to be gathered together to give a zigzag-fold arrangement and, finally, the filter element has to be brought into abutment against the lateral surface of the carrier casing and fixed in this position. This large number of process steps prolongs the time required for production and also increases the number of possible sources of errors during the assembly of the filter.

The problem on which the invention is based is to design a filter of the generic type which can be mass-produced with a higher level of operational reliability.

This problem is solved according to the invention by the features of claim 1.

The clamping strip ensures that the end folds are held against one another with a defined clamping force which is of such a magnitude that unwanted flows between the contaminated side and clean side are prevented. The production speed can be increased because all that is required is for the end folds to be fitted into the clamping strip; furthermore, no further measures are necessary for a sealed termination of the two end folds, with the result that the filter is suitable in a particularly advantageous manner for mass production.

The clamping strip, which is arranged on the carrier casing, simplifies the assembly of the individual filter elements. The filter element is automatically connected to the carrier casing as soon as the end folds are fitted into the clamping strip. Additional filter-element-supporting components may be dispensed with or at least designed more simply.

According to a preferred embodiment, the clamping strip has approximately the same axial length as the carrier casing, with the result that the end folds of the filter element are reliably held together over the entire axial height of the filter.

The clamping strip expediently comprises two axially running clamping walls between which a clamping chamber is formed for receiving the end folds of the filter. On the side directed toward the clamping chamber, the advantageously mirror-symmetrical clamping walls each have a clamping nose via which the clamping pressure which is necessary for a sealed connection is applied. The clamping walls may enclose a small angle which opens in the radially outward direction, in order to facilitate the operation of fitting in the end folds.

In the filter folds of the filter element, it is possible to provide stamped formations which ensure that the walls of the filter folds, which are grouped in a zigzag arrangement around the carrier zone, do not butt directly against one another, but rather are fanned out radially and allow the medium which is to be cleaned to flow through. In order to receive the stamped formations in the end folds, there are provided in the clamping walls recesses which run in the longitudinal direction. The side surfaces of the two end folds fitted into the clamping strip can thus butt against one another with the smallest possible spacing between them.

The end sides of the carrier casing, of the clamping strip and of the filter element are expediently covered by end disks in order to separate the contaminated side from the clean side and in order to transfer to the stable carrier casing axial loading which acts on the filter. A sealed termination may be achieved by the end sides being secured in the end disk by plastification. In order to facilitate this operation of securing by plastification, provision is made for the end sides of the carrier casing and clamping strip each to have a plastification border, of which the wall thickness is reduced in relation to the wall thickness of the carrier casing and clamping strip. The thickness of the plastification border expediently corresponds to the thickness of the filter folds, with the result that, when the end side is pressed into the plastically deformable end disk, the clamping strip and the carrier casing provide approximately the same, reduced resistance as the filter element; this ensures that the end side is pressed uniformly into the end disk at right angles to the longitudinal axis of the filter.

Moreover, the tapered plastification border ensures that the end side is pressed into the end disk to a defined depth. A shoulder is formed between the plastification border and the respective end side of the wall of the carrier casing and/or clamping strip, and this shoulder indicates the maximum pressing-in depth. As soon as the shoulder comes into contact with the end disk, the pressure necessary for a pressing-in operation increases abruptly. With a predetermined, constant plastification pressure, this ensures that the pressing-in operation can only take place until there is abutment against the shoulder.

Figure 2:
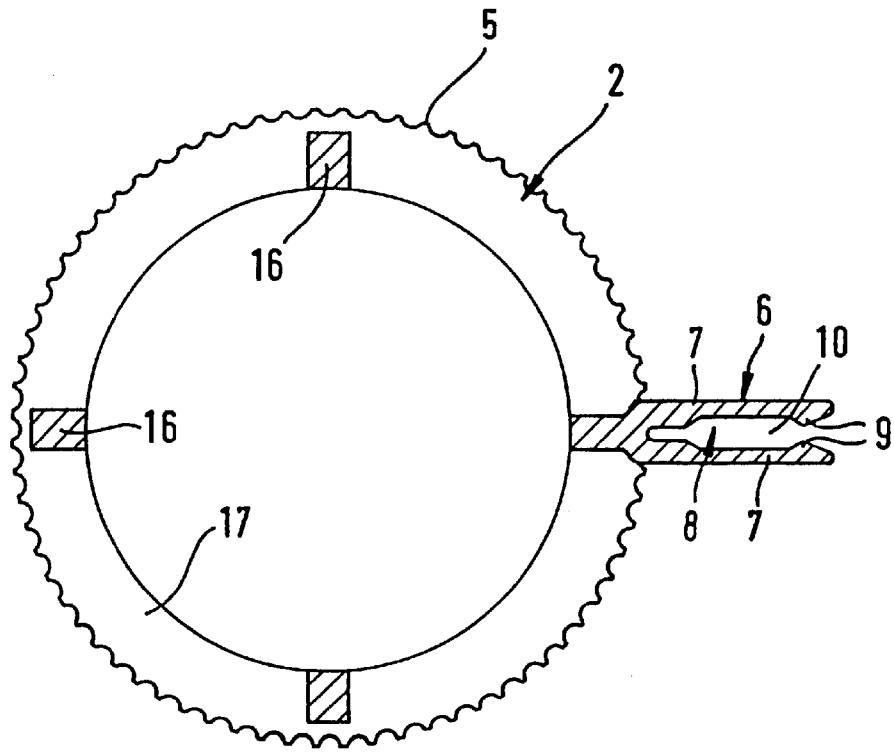
Figure 3:
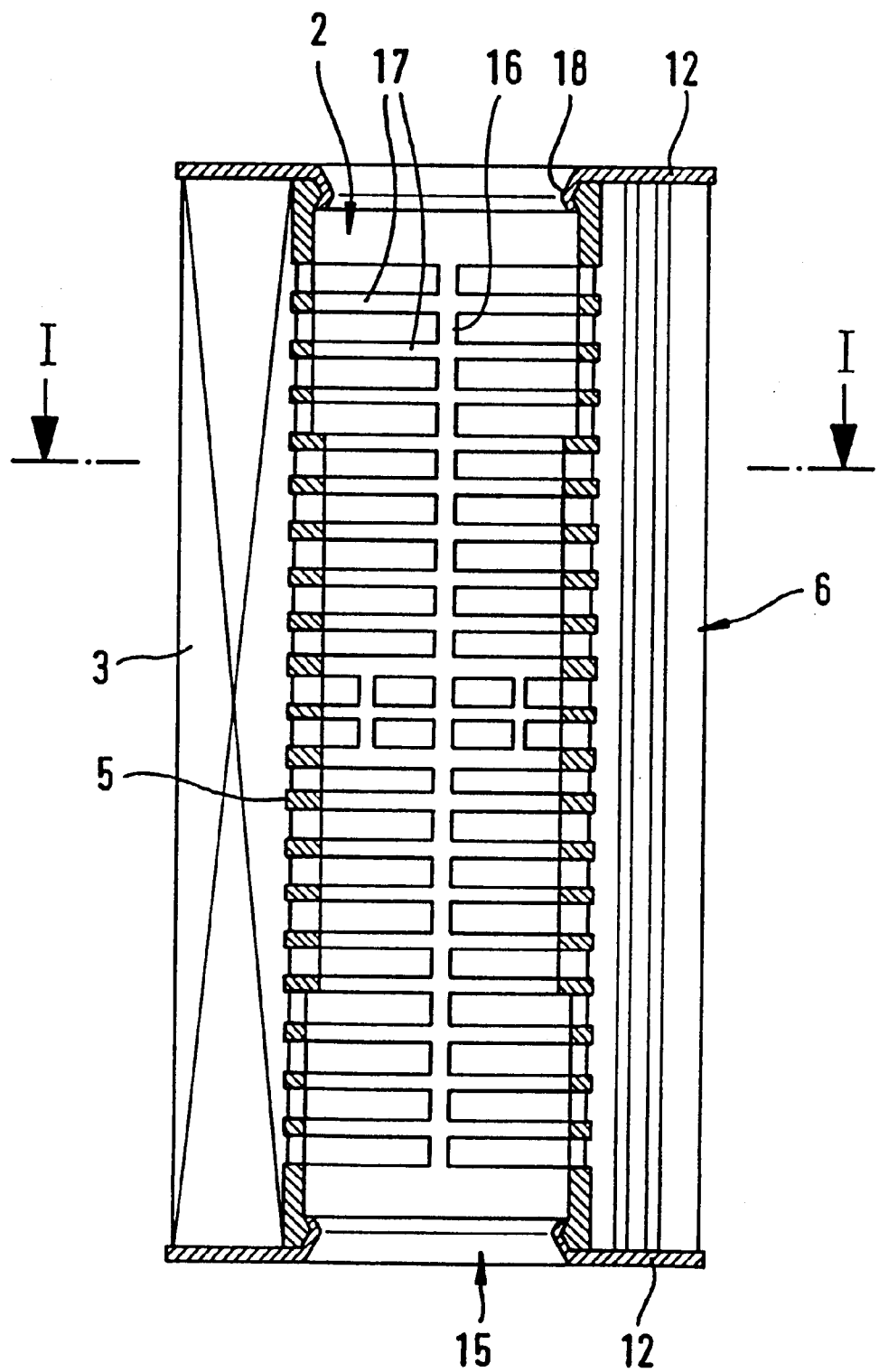
Figure 4:
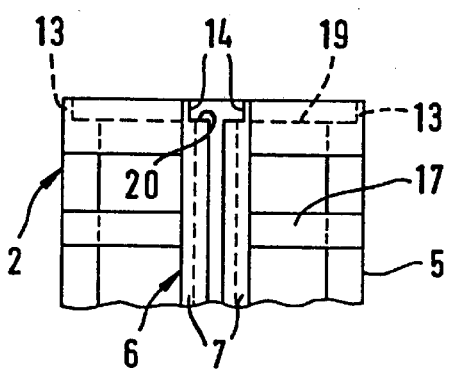
Figure 5:
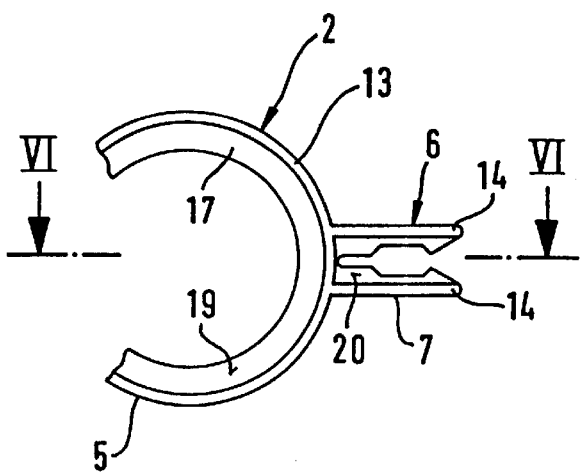
Figure 6:
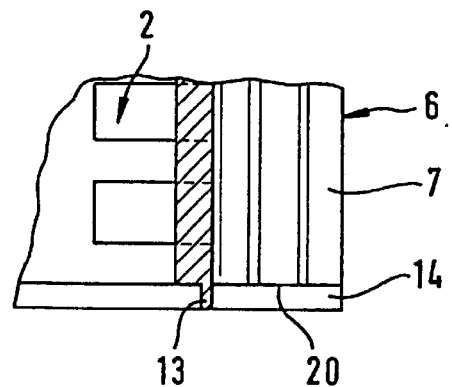
Figure 7:
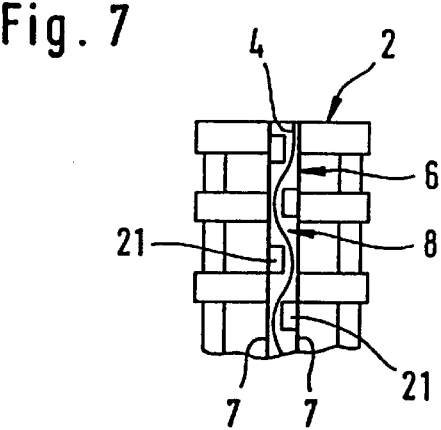

Further advantages and expedient embodiments can be gathered from the rest of the claims, the description of the figures and the drawings, in which:

FIG. 1 shows a filter in a section along line I—I in FIG. 3,

FIG. 2 shows the carrier casing with clamping strip of the filter according to FIG. 1 in the same sectional illustration as in FIG. 1, FIG. 3 shows a section through the filter, FIG. 4 shows a view of the carrier casing and clamping strip with plastification border, FIG. 5 shows a plan view of the carrier casing and clamping strip with plastification border, FIG. 6 shows a section along section line VI—VI from FIG. 5, and FIG. 7 shows the carrier casing and clamping strip in a further embodiment.

The oil filter 1 for internal combustion engines which is illustrated in FIG. 1 has a filter element 3 which is held by a hollow-cylindrical carrier casing 2. The filter element 3 consists of zigzag-folded nonwoven-polymer web material and encloses, in the form of a zigzag-fold arrangement, the lateral surface of the carrier casing 2. The medium which is to be cleaned flows against the filter element 3 radially from the outside. The carrier casing 2 has recesses in the lateral surface, with the result that the medium which has passed the filter element 3 can flow into the cylindrical clean chamber 15 in the interior of the carrier casing 2 and can be fed for further usage.

The filter 1 may, if appropriate, also be used as a fuel filter.

Arranged on the lateral surface of the carrier casing 2 is a clamping strip 6 which receives the end folds 4 of the filter element 3 and connects these to one another in order to prevent unwanted flows of the medium which is to be cleaned. The clamping strip 6 expediently consists of polymer material, as does the carrier casing 2, and is held in captive fashion, in particular injection-molded, on the carrier casing 2. The clamping strip 6 has the same axial length as the carrier casing 2 and is of continuous design, without interruptions, over the axial length.

As can be gathered from the enlarged illustration according to FIG. 2, the clamping strip 6 comprises two approximately parallel clamping walls .7 which are aligned radially to the lateral surface 5 of the carrier casing and are of mirror-symmetrical design with respect to one another. The two clamping walls 7 form a single-piece component and are connected to one another in the region of the lateral surface 5 of the carrier casing 2. The clamping walls 7 bound a clamping chamber 8 between them in order to receive the end folds of the filter element. In the region of the push-in opening for the end folds, each clamping wall 7 has a clamping nose 9 which forms a clamping region for the end folds. The two mutually opposite clamping noses 9 fix the two end folds, fitted into the clamping chamber 8, over the entire length of the clamping strip 6.

Between the clamping nose 9 and that section in the region of the lateral surface 5 which connects the two clamping walls, each clamping wall 7 has a recess 10 which extends, as do the clamping noses 9, over the axial length of the clamping strip. The recess 10 serves for receiving stamped formations in the filter folds, the width of the recesses corresponding to the width of the stamped formations.

It may be expedient for the clamping walls 7 to be arranged in a slightly angled manner with an angle which opens in the radially outward direction; this makes it easier for the end folds to be fitted in during the assembly.

As can be gathered from FIG. 2 in conjunction with FIG. 3, the carrier casing 2 comprises individual ring elements 17 which are located one above the other and are connected to one another via four longitudinal webs 16 each offset by 90°. The lateral surface 5 of the carrier casing and/or of the ring elements 17 is of corrugated design, in order to prevent the filter element from sliding off the carrier casing.

FIG. 3 also illustrates that the carrier casing 2, the clamping strip 6 and the filter element 3 are covered on both end sides of the filter in each case by an end disk 12 which has a central opening directed toward the clean chamber 15. The end disk 12 consists of a plastifiable polymer material and, during the production of the filter, is incipiently melted on the side directed toward the filter elements. The end disk 12 is then fitted by way of its annular shoulder 18, which projects into the clean chamber 15, onto the carrier casing 2 until the end sides of the carrier casing 2, clamping strip 6 and filter element 3 project some way into the plastically deformable side of the end disk 12. Once the end disk 12 has hardened, the clean chamber 15 is sealed off from the contaminated side of the filter, with the result that unwanted flows are prevented.

In the case of the embodiment illustrated in FIGS. 4 to 6, the operation of the end sides of the carrier casing 2 and clamping strip 6 being secured in the end disk 12 by plastification is assisted. The carrier casing 2 and the clamping strip 6 each have on their end side a plastification border 13, 14 which is secured in the end disk by plastification.

The plastification border 13 of the carrier casing 2 is designed as a peripheral annular wall, of which the thickness is smaller than the wall thickness of a ring element 17 of the carrier casing 2, with the result that a bearing shoulder 19 is formed in the region of the end side.

In the exemplary embodiment, the outside of the plastification border 13 is located in the lateral surface 5 of the carrier casing. In accordance with an embodiment which is not illustrated, it is also possible for the plastification border 13 to terminate with the inner lateral surface of the carrier casing or to be arranged centrally on the end side of the carrier casing, with the result that a peripheral bearing shoulder is formed on both sides of the plastification border.

Provided on the end side of each clamping wall 7 of the clamping strip 6 is a plastification border 14 which extends over the entire width of the clamping wall as far as the plastification border 13 of the carrier casing 2. The plastification border 13 terminates with the outside of the clamping wall 7. The thickness of the plastification wall 13 is smaller than the wall thickness of the clamping wall 7, with the result that a bearing section 20, which is directed inward, is formed in the region of the end side of the clamping wall 7.

The thicknesses of the two plastification borders 13 and 14 are approximately equal and correspond to the thickness of a filter fold of the filter element. The axial extent of the carrier casing and of the clamping strip including the respective plastification borders 13, 14 is approximately equal to the axial length of the filter element. This has the advantage that, during the operation of securing by plastification, the carrier casing, the clamping strip and the filter element can be pressed uniformly into the end disk until the bearing shoulder 19 and/or the bearing section 20 come into abutment against the end disk.

In the embodiment according to FIG. 7, the clamping strip 6 fastened on the carrier casing 2, has two clamping walls 7 which are essentially parallel to one another and receive the end folds 4 of the filter element between them. The clamping region on the clamping walls 7 comprises individual clamping blocks 21 which are provided on each clamping wall 7 such that they are offset alternately; the clamping region is thus of non-continuous design. The width of each clamping block 21 slightly exceeds half the clear width of the clamping chamber 8, with the result that the offset clamping blocks 21 partially overlap one another as seen in the longitudinal direction of the clamping strip. The end folds 4, secured in the clamping chamber 8, thus assume an undulating shape.

What is claimed is:

1. A filter comprising a hollow-cylindrical carrier casing (2) having an outer lateral surface which bounds a clean chamber (15), and a filter element (3) having end folds which encloses the carrier casing (2) and consists of zigzag-folded web material, the end folds (4) of the filter element (3) being held together such that they butt against one another, a clamping strip (6) which fixes the end folds (4) of the filter element (3), said strip radially extending from the outer lateral surface (5) of the carrier casing (2), wherein the clamping strip (6) holds the end folds (4) against one another with a defined clamping force which is of such a magnitude that unwanted flows between a contaminated side and a clean side are prevented, and wherein the carrier casing (2) and the clamping strip (6) form a single-piece component, wherein an end side of the carrier casing, of the clamping strip and of the filter element is closed off by an end disk consisting of a plastifiable polymer material, and wherein a cross-sectionally tapered plastification border is provided on said end side of the carrier casing and clamping strip.

2. The filter as claimed in claim 1, wherein the clamping strip (6) has two clamping walls (7) which bound a clamping chamber (8) between them.

3. The filter as claimed in claim 1, wherein a clamping region on the clamping walls (7) is formed by individual clamping blocks (21).

4. The filter as claimed in claim 3, wherein the individual clamping blocks (21) are arranged on the clamping walls (7) such that they are offset alternately in the longitudinal direction of the clamping strip (6), with the result that the end folds (4) assume an undulating progression.

5. The filter as claimed in claim 3, wherein the plane of the clamping walls (7) runs approximately radially to the hollow-cylindrical carrier casing (2).

6. The filter as claimed in claim 3, wherein the clamping walls (7) are of mirror-symmetrical design.

7. The filter as claimed in claim 2, wherein, on the side directed toward the clamping chamber (8), the clamping walls (7) have a clamping nose (9).

8. The filter as claimed in claim 3, wherein the clamping walls (7) have a recess (10) which runs in the longitudinal direction, extends over the length of the clamping wall (7) and is intended for receiving stamped formations in the filter end folds.

9. The filter as claimed in claim 3, wherein the clamping walls (7) enclose a small angle which opens in a radially outward direction.

10. The filter as claimed in claim 1, wherein a clamping region of the clamping walls (7) is of continuous design.

11. The filter as claimed in claim 1, wherein the clamping strip (6) has approximately the same axial length as the carrier casing (2).

12. The filter as claimed in claim 1, wherein the thickness of the plastification border (13, 14) corresponds approximately to the thickness of the filter end folds of the filter element.

13. The filter as claimed in claim 1, wherein the carrier casing (2) and the clamping strip (6) consist of polymer material.

* * * * *